US011466150B2

(12) United States Patent
Isobe et al.

(10) Patent No.: US 11,466,150 B2
(45) Date of Patent: Oct. 11, 2022

(54) BLOCK COPOLYMER COMPOSITION OBTAINED BY MODIFICATION TREATMENT, METHOD FOR PRODUCING SAME, MODIFIED BLOCK COPOLYMER COMPOSITION USED FOR SAME, AND METHOD FOR PRODUCING SAID MODIFIED BLOCK COPOLYMER COMPOSITION

(71) Applicants: ZEON CORPORATION, Tokyo (JP); NATIONAL UNIVERSITY CORPORATION NAGOYA UNIVERSITY, Nagoya (JP)

(72) Inventors: Kousuke Isobe, Tokyo (JP); Sadaharu Hashimoto, Tokyo (JP); Atsushi Nozawa, Tokyo (JP); Ryoji Kameyama, Tokyo (JP); Atsushi Noro, Nagoya (JP); Takato Kajita, Nagoya (JP); Yushu Matsushita, Nagoya (JP)

(73) Assignees: ZEON CORPORATION, Tokyo (JP); NATIONAL UNIVERSITY CORPORATION NAGOYA UNIVERSITY, Nagoya (JP)

( * ) Notice: Subject to any disclaimer, the term of this patent is extended or adjusted under 35 U.S.C. 154(b) by 328 days.

(21) Appl. No.: 16/609,836

(22) PCT Filed: May 1, 2018

(86) PCT No.: PCT/JP2018/017439
§ 371 (c)(1),
(2) Date: Oct. 31, 2019

(87) PCT Pub. No.: WO2018/207683
PCT Pub. Date: Nov. 15, 2018

(65) Prior Publication Data
US 2020/0062948 A1 Feb. 27, 2020

(30) Foreign Application Priority Data
May 11, 2017 (JP) .............................. JP2017-095056

(51) Int. Cl.
*C08L 53/02* (2006.01)
*C08J 5/18* (2006.01)
*C08F 297/08* (2006.01)

(52) U.S. Cl.
CPC ................................ *C08L 53/025* (2013.01)

(58) Field of Classification Search
CPC .... C08L 53/02; C08F 297/08; C08F 2500/26; C08F 2420/00; C08J 5/18; C08J 2325/08
See application file for complete search history.

(56) References Cited

U.S. PATENT DOCUMENTS

| 4,292,414 A | 9/1981 | Saito et al. |
| 6,248,702 B1 | 6/2001 | Coolbaugh et al. |
| 2010/0190886 A1 | 7/2010 | Schmitt et al. |

FOREIGN PATENT DOCUMENTS

| EP | 1961778 A1 | 8/2008 | |
| JP | S5483091 A | 7/1979 | |
| JP | S54146889 A | 11/1979 | |
| JP | S5560511 A | 5/1980 | |
| JP | S56115307 A | 9/1981 | |
| JP | S56116702 A | 9/1981 | |
| JP | S-56116702 A1 * | 9/1981 | ............ C08F 285/00 |
| JP | S56120753 A | 9/1981 | |
| JP | S6243411 A | 2/1987 | |
| JP | S62181307 A | 8/1987 | |
| JP | 2012077158 A | 4/2012 | |
| JP | 2016089099 A | 5/2016 | |
| WO | 2009013089 A1 | 1/2009 | |

OTHER PUBLICATIONS

Jul. 17, 2018, International Search Report issued in the International Patent Application No. PCT/JP2018/017439.
Nov. 12, 2019, International Preliminary Report on Patentability issued in the International Patent Application No. PCT/JP2018/017439.

* cited by examiner

*Primary Examiner* — Robert D Harlan
(74) *Attorney, Agent, or Firm* — Kenja IP Law PC

(57) ABSTRACT

A main object of the present invention is to provide a block copolymer composition which has good elasticity, while having excellent stress relaxation properties. The object is achieved by providing a block copolymer composition obtained by a modification treatment, the block copolymer composition comprising a block copolymer B formed by introducing a functional group capable of forming a non-covalent bond into a block copolymer A including at least one aromatic vinyl polymer block and at least one conjugated diene polymer block.

10 Claims, No Drawings

BLOCK COPOLYMER COMPOSITION OBTAINED BY MODIFICATION TREATMENT, METHOD FOR PRODUCING SAME, MODIFIED BLOCK COPOLYMER COMPOSITION USED FOR SAME, AND METHOD FOR PRODUCING SAID MODIFIED BLOCK COPOLYMER COMPOSITION

TECHNICAL FIELD

The present invention relates to a block copolymer composition containing a block copolymer that includes an aromatic vinyl polymer block and a conjugated diene polymer block, in further details, relates to the block copolymer composition which has good elasticity, while having excellent stress relaxation properties.

BACKGROUND ART

A thermoplastic elastomer has been utilized in various fields as a flexible material since it exhibits rubber elasticity at a normal temperature and the mold fabrication thereof is easy since it is softened and exhibits fluidity when heated.

On the occasion of using the thermoplastic elastomer as a flexible material in various applications, both of comparatively high elasticity and small tension set are required. Accordingly, various studies have been conducted in order to improve the properties of the thermoplastic elastomer.

For example, as disclosed in Patent Literature 1, a part of the inventors of the present application have reported that elastic properties such as breaking elongation, maximum stress, and toughness have been improved when, in an elastomer including a block copolymer comprising A chain: a hard polymer chain which is in a glass state in the vicinity of room temperature, and B chain: a soft chain which is in a melted state in the vicinity of room temperature, a monomer including a functional group capable of forming a non-covalent bond is brought to be included in a polymerized state in the B chain, so as monomer components form non-covalent bonds among molecules to form pseudo cross-linking.

Meanwhile, the thermoplastic elastomer is required to have excellent stress relaxation properties. Large residual stress when a pressure is applied and deformed means that the force of attempting to be back in an original form is large. Accordingly, when the stress relaxation properties are inferior, comparatively large residual stress is continuously applied on the occasion of applying the thermoplastic elastomer to various parts, which easily cause peel-off and breakdown. Thus, decreasing the applied pressure so as to minimize the residual pressure, that is to have excellent stress relaxation properties, is also required.

Therefore, regarding the thermoplastic elastomer, further improvement has been desired from the viewpoint of achieving both elasticity and stress relaxation properties in high levels.

CITATION LIST

Patent Literature

Patent Literature 1: Japanese Patent Application Laid-Open (JP-A) No. 2016-89099

SUMMARY OF INVENTION

Technical Problem

The present invention has been made in view of the above circumstances and a main object thereof is to provide a block copolymer composition which has good elasticity, while having excellent stress relaxation properties.

Solution to Problem

The inventors of the present invention conducted a thorough investigation in order to achieve the object; as the result, they have found out that both high elasticity and stress relaxation properties may be achieved with a high level of compatibility when a block copolymer including an aromatic vinyl polymer block and a conjugated diene polymer block, that is particularly rich in elasticity and flexible among thermoplastic elastomers, is used and a functional group capable of forming a non-covalent bond is introduced thereto, and the present invention has been completed based on this finding.

Thus, the present invention provides a block copolymer composition obtained by a modification treatment, the block copolymer composition characterized by comprising a block copolymer B formed by introducing a functional group capable of forming a non-covalent bond into a block copolymer A including at least one aromatic vinyl polymer block and at least one conjugated diene polymer block.

The functional group capable of forming a non-covalent bond may be a group formed by a reaction of a carboxyl group or an acid anhydride group introduced to the block copolymer A with a base; or a group formed by hydrolyzing an acid anhydride group introduced to the block copolymer A with a base.

The acid anhydride group is preferably a group derived from an unsaturated dicarboxylic acid anhydride.

The base may be at least one kind selected from the group consisting of an alkali metal-containing compound, an alkali earth metal-containing compound, ammonia, and an amine compound.

The functional group capable of forming a non-covalent bond is preferably a functional group capable of forming a hydrogen bond.

It is preferable that the weight average molecular weight of the aromatic vinyl polymer block is in a range of 3,000 to 50,000; a vinyl bond content in the conjugated diene polymer block is in a range of 0.1 mol % to 50 mol % and a weight average molecular weight thereof is in a range of 10,000 to 500,000.

The aromatic vinyl polymer block is preferably polystyrene.

The conjugated diene polymer block is preferably polybutadiene and/or polyisoprene.

The present invention also provides a method for producing a block copolymer composition, the method characterized by comprising steps of: a first step of obtaining a modified block copolymer C to which a carboxyl group or an acid anhydride group is introduced via a reaction of a block copolymer A including at least one aromatic vinyl polymer block and at least one conjugated diene polymer block with an unsaturated carboxylic acid or an unsaturated dicarboxylic acid anhydride; and a second step of conducting a base treatment to the modified block copolymer C to obtain a block copolymer B to which a functional group capable of forming a non-covalent bond is introduced.

In the first step, it is preferable that the reaction involves the unsaturated dicarboxylic acid anhydride.

In the second step, it is preferable that at least one kind of base selected from the group consisting of an alkali metal-containing compound, an alkali earth metal-containing compound, ammonia, and an amine compound, is used.

Further, the present invention provides a modified block copolymer composition characterized by comprising a modified block copolymer C formed by introducing a carboxyl group or an acid anhydride group derived from an unsaturated carboxylic acid or an unsaturated dicarboxylic acid anhydride into a block copolymer A including at least one aromatic vinyl polymer block and at least one conjugated diene polymer block.

It is preferable that the weight average molecular weight of the aromatic vinyl polymer block is in a range of 3,000 to 50,000; a vinyl bond content in the conjugated diene polymer block is in a range of 0.1 mol % to 50 mol % and a weight average molecular weight thereof is in a range of 10,000 to 500,000.

The aromatic vinyl polymer block is preferably polystyrene.

The conjugated diene polymer block is preferably polybutadiene and/or polyisoprene.

The present invention also provides a method for producing a modified block copolymer composition, the method characterized by comprising a step of obtaining a modified block copolymer C to which a carboxyl group or an acid anhydride group is introduced via a reaction of a block copolymer A including at least one aromatic vinyl polymer block and at least one conjugated diene polymer block with an unsaturated carboxylic acid or an unsaturated dicarboxylic acid anhydride.

Advantageous Effects of Invention

The present invention exhibits an effect of providing a block copolymer composition which has good elasticity, while having excellent stress relaxation properties.

DESCRIPTION OF EMBODIMENTS

The block copolymer composition obtained by modification treatment, the method for producing same, the modified block copolymer composition, and the method for producing said modified block copolymer composition of the present invention are hereinafter described in details.

A. Block Copolymer Composition Obtained by Modification Treatment

The block copolymer composition obtained by a modification treatment of the present invention comprises a block copolymer B formed by introducing a functional group capable of forming a non-covalent bond into a block copolymer A including at least one aromatic vinyl polymer block and at least one conjugated diene polymer block.

Incidentally, "the block copolymer composition obtained by a modification treatment" may be simply referred to as "the block copolymer composition" in some cases.

According to the present invention, the block copolymer B includes the functional group capable of forming a non-covalent bond and thus a non-covalent bond may be formed among polymer chains using the functional group capable of forming a non-covalent bond to form a pseudo-crosslinking. The non-covalent bond is capable of detachment and recombination, and thus the block copolymer composition of the present invention is capable of achieving different properties from those of conventional block copolymer compositions.

The block copolymer composition of the present invention exhibits fluidity at a high temperature since the aromatic vinyl polymer block in the block copolymer melts, but it exhibits elasticity since the aromatic vinyl polymer block in the block copolymer is vitrified to become a physical crosslinking point. The non-covalent bond using the functional group capable of forming a non-covalent bond works as a non-covalent bond crosslinking point along with a physical crosslinking point formed by the aromatic vinyl polymer block in the block copolymer, and thus the elasticity of the block copolymer composition may be maintained or improved. Meanwhile, when stress or strain is applied, in principle, the stress may be dispersed as much as the non-covalent bond crosslinking points has increased, and also, the stress may be relaxed when the functional group capable of forming a non-covalent bond is recombined, and thus the physical crosslinking point may be protected. In other words, even when the stress relaxation occurs, the physical crosslinking point is maintained, and thus the elastic degradation can be suppressed. Therefore, both good elasticity and excellent stress relaxation may be achieved. Also, the physical crosslinking point is protected and thus the tension set may be reduced, and both high elastic modulus and a small tension set may be achieved with a high level of compatibility.

Also, according to the present invention, the block copolymer B is formed by introducing a functional group capable of forming a non-covalent bond into the block copolymer A, and thus high elasticity and flexibility of the block copolymer including the aromatic vinyl polymer block and the conjugated diene polymer block can be maintained. On the other hand, in the case of copolymerizing a monomer including a functional group capable of forming a non-covalent bond, the copolymerization itself is difficult, and the desired block copolymer, in other words, the block copolymer that exhibits high elasticity and flexibility may not be obtained in some cases.

1. Block Copolymer B

The block copolymer B used in the present invention is formed by introducing a functional group capable of forming a non-covalent bond into a block copolymer A including at least one aromatic vinyl polymer block and at least one conjugated diene polymer block. The block copolymer B is used as a polymer component in the block copolymer composition of the present invention.

Incidentally, in the present specification, "block copolymer" is meant to include any forms of a pure block copolymer, a random block copolymer, and a copolymer having a taper block structure, unless otherwise explained.

(1) Block Copolymer a

The block copolymer A includes at least one aromatic vinyl polymer block and at least one conjugated diene polymer block.

(a) Aromatic Vinyl Polymer Block

The aromatic vinyl polymer block included in the block copolymer A is a polymer block configured such that an aromatic vinyl monomer unit obtained by polymerization of an aromatic vinyl monomer becomes a main repeating unit.

There are no particular limitations on the aromatic vinyl monomer used to form the aromatic vinyl polymer block if it is an aromatic vinyl compound. Examples thereof may include styrene; styrenes having an alkyl group as a substituent such as α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, and 5-t-butyl-2-methylstyrene; styrenes having an ether group or an ester group as a substituent such as 4-acetoxystyrene, 4-(1-ethoxyethoxy)styrene, 4-methoxystyrene, 4-ethoxystyrene, and 4-t-butoxystyrene; styrenes having a halogen atom as a substituent such as 2-chlorostyrene, 3-chlorostyrene, 4-chlorostyrene, 4-bromostyrene, and 2,4-dibromostyrene; styrenes having an alkyl group and a halogen atom as a substituent such as 2-methyl-4,6-dichlorostyrene; and vinyl naphthalene. These aromatic vinyl monomers may be used in one kind alone, or two kinds or more thereof may be used in combination.

Among these, from the perspective of the ease in availability, styrene, styrenes having C1 to C12 alkyl group as a substituent, and styrenes having an ether group or an ester group as a substituent are preferable, and the usage of styrene is particularly preferable. It means that the aromatic vinyl polymer block is preferably polystyrene.

The aromatic vinyl polymer block may include a monomer unit other than the aromatic vinyl monomer unit as long as the aromatic vinyl monomer unit becomes a main repeating unit. Examples of the monomer that constitutes the monomer unit other than the aromatic vinyl monomer unit that can be included in the aromatic vinyl polymer block may include, conjugated diene monomers such as 1,3-butadiene and isoprene(2-methyl-1,3-butadiene); α,β-unsaturated nitrile monomers such as acrylonitrile and methacrylonitrile; unsaturated carboxylic acid anhydride monomers such as maleic anhydride, butenyl succinic anhydride, tetrahydro phthalic anhydride, and citraconic anhydride; unsaturated carboxylic acid ester monomers such as methyl acrylate, ethyl acrylate, 2-ethylhexyl acrylate, methyl methacrylate, ethyl methacrylate, and 2-ethylhexyl methacrylate; and non-conjugated diene monomers preferably with 5 to 12 carbon atoms such as 1,4-pentadiene and 1,4-hexadiene.

Also, when the block copolymer A includes a plurality of the aromatic vinyl polymer block, the plurality of the aromatic vinyl polymer block may be the same and may be different from each other.

The content of the aromatic vinyl monomer unit in the aromatic vinyl polymer block is preferably 80 mass % or more, more preferably 90 mass % or more, and particularly preferably substantially 100 mass %. The content of the aromatic vinyl monomer unit in the aromatic vinyl block is in the above described range and thus both high elasticity and stress relaxation may be achieved with a high level of compatibility.

There are no particular limitations on the content of the aromatic vinyl monomer unit relative to all monomer units in the block copolymer A; it is usually selected in a range of 5 mass % to 90 mass %, and preferably selected in a range of 10 mass % to 60 mass %. When the content of the aromatic vinyl monomer unit in the block copolymer A is in the above described range, the block copolymer composition to be obtained may have both high elasticity and stress relaxation with a high level of compatibility. Incidentally, the content of the aromatic vinyl monomer unit in the block copolymer may be measured using $^1$H-NMR.

(b) Conjugated Diene Polymer Block

The conjugated diene polymer block included in the block copolymer A is a polymer block configured such that a conjugated diene monomer unit obtained by polymerization of a conjugated diene monomer becomes a main repeating unit.

There are no particular limitations on the conjugated diene monomer used to form the conjugated diene polymer block if it is a conjugated diene compound. For example, 1,3-butadiene, isoprene, 2,3-dimethyl-1,3-butadiene, 2-chloro-1,3-butadiene, 1,3-pentadiene, and 1,3-hexadiene may be exemplified. These conjugated diene monomers may be used in one kind alone, or two kinds or more thereof may be used in combination.

Among these, it is preferable to use 1,3-butadiene and/or isoprene. It means that the conjugated diene polymer block is preferably polybutadiene and/or polyisoprene. When the conjugated diene polymer block is configured by an isoprene unit, the block copolymer composition may be excellent in flexibility and stress relaxation.

The conjugated diene polymer block may include a monomer unit other than the conjugated diene monomer unit as long as the conjugated diene monomer unit becomes a main repeating unit. Examples of the monomer that constitutes the monomer unit other than the conjugated diene monomer unit that can be included in the conjugated diene polymer block may include, aromatic vinyl monomers such as styrene and α-methylstyrene; α,β-unsaturated nitrile monomers; unsaturated carboxylic acid anhydride monomers; unsaturated carboxylic acid ester monomers; and non-conjugated diene monomers. Incidentally, detailed examples of each monomer may be the same as the monomers that constitute the above described monomer unit other than the aromatic vinyl monomer unit that can be included in the aromatic vinyl polymer block.

Also, when the block copolymer A includes a plurality of the conjugated diene polymer block, the plurality of the conjugated diene polymer block may be the same and may be different from each other. Further, a part of the unsaturated bond in the conjugated diene polymer block may be hydrogenated.

The content of the conjugated diene monomer unit in the conjugated diene polymer block is preferably 80 mass % or more, more preferably 90 mass % or more, and particularly preferably substantially 100 mass %. When the content of the conjugated diene monomer unit in the conjugated diene polymer block is in the above described range, both high elasticity and stress relaxation may be achieved with a high level of compatibility.

Also, the vinyl bond content in the conjugated diene polymer block (the content of 1,2-vinyl bonds and 3,4-vinyl bonds relative to all conjugated diene monomer units in the conjugated diene polymer block) is not particularly limited, but is preferably in a range of 0.1 mol % to 50 mol %, more preferably in a range of 1 mol % to 30 mol %, and particularly preferably in a range of 3 mol % to 10 mol %. If the vinyl bond content is too high, there is a risk that the tension set of the block copolymer composition to be obtained may increase. Incidentally, the vinyl bond content in the conjugated diene polymer block may be measured using $^1$H-NMR.

(C) Block Copolymer A

There are no particular limitations on the number of each polymer block and the form of their bonds in the block copolymer A as long as the block copolymer A includes at least one aromatic vinyl polymer block and at least one conjugated diene polymer block.

Specific examples of the form of the block copolymer A may include but not limited to, when provided that Ar represents an aromatic vinyl polymer block, D represents a conjugated diene polymer block, X represents a single bond or a residue of coupling agent, and n represents an integer of 2 or more, an aromatic vinyl-conjugated diene block copolymer represented by Ar-D, an aromatic vinyl-conjugated diene-aromatic vinyl block copolymer represented by Ar-D-Ar or (Ar-D)$_n$-X, a conjugated diene-aromatic vinyl-conjugated diene block copolymer represented by D-Ar-D or (D-Ar)$_n$-X, an aromatic vinyl-conjugated diene-aromatic vinyl-conjugated diene block copolymer represented by Ar-D-Ar-D, and a mixture of block copolymer configured by mixing two kinds or more of these in an arbitrary combination.

In the specific example above, there are no particular limitations on a coupling agent if it is bifunctional, and examples thereof may include bifunctional halogenated silane such as dichlorosilane, monomethyldichlorosilane, and dimethyldichlorosilane; bifunctional halogenated alkane such as dichloroethane, dibromoethane, methylenechloride, and dibromomethane; and bifunctional halogenated tin such as dichlorotin, monomethyldichlorotin, dimethyldichlorotin, monoethyldichlorotin, diethyldichlorotin, monobutyldichlorotin, and dibutyldichlorotin. These coupling agents may be used in one kind alone, or two kinds or more thereof may be used in combination.

There are no particular limitations on the weight average molecular weight of the block copolymer A, but it is usually 30,000 to 500,000, is preferably 60,000 to 470,000, and more preferably 90,000 to 450,000.

Also, there are no particular limitations on the average molecular weight of each polymer block in the block copolymer A. The weight average molecular weight of the aromatic vinyl polymer block is preferably in a range of 3,000 to 50,000, and more preferably in a range of 6,000 to 20,000. Also, the weight average molecular weight of the conjugated diene polymer block is preferably in a range of 10,000 to 500,000, and more preferably in a range of 40,000 to 400,000. When the weight average molecular weight of the conjugated diene polymer block is in the above described range, the block copolymer composition to be obtained may have both high elasticity and stress relaxation with a high level of compatibility. Incidentally, the weight average molecular weight (Mw) of the block copolymer is meant to be determined as a value measured by high performance liquid chromatography using tetrahydrofuran (THF) as a solvent, and calculated relative to polystyrene standards.

There are no particular limitations on the molecular weight distribution represented by the ratio (Mw/Mn) of the weight average molecular weight (Mw) of the polymer block A and each polymer block that constitutes the block copolymer A, and the number average molecular weight (Mn) thereof, and the ratio is respectively usually 1.8 or less, preferably 1.3 or less, and more preferably 1.1 or less. When the molecular weight distribution of the block copolymer A and each polymer block that constitutes the block copolymer A is respectively in the above described range, the block copolymer composition to be obtained may have both high elasticity and stress relaxation with a high level of compatibility.

There are no particular limitations on the melt index of the block copolymer A, but as a value measured based on ASTM D-1238 (G condition, 200° C., 5 kg), it is usually 1 to 1000 g/10 minutes, preferably 3 to 700 g/10 minutes, and more preferably 5 to 500 g/10 minutes.

The block copolymer A can be produced according to a usual method. Incidentally, the method for producing the block copolymer A is described in the section "B. Method for producing block copolymer composition" later.

Also, in the present invention, a commercial block copolymer may be used as the block copolymer A. For example, "Quintac™ (registered trademark)" (from ZEON CORPORATION), "JSR-SIS™ (registered trademark)" (from JSR Corporation), "Vector™ (registered trademark)" (from DEXCO polymers LP), "Asaprene™ (registered trademark)", "Tufprene™ (registered trademark)" and "Tuftec™ (registered trademark)" (all from Asahi Kasei Corporation), "SEPTON™ (registered trademark)" (from KURARAY CO., LTD.), and "Kraton™ (registered trademark)" (from Kraton JSR Elastomers K. K.) may be used.

(2) Functional Group Capable of Forming Non-Covalent Bond

Examples of the non-covalent bond may include a hydrogen bond, a coordination bond, and an ionic bond. Above all, the functional group capable of forming a non-covalent bond is preferably a functional group capable of forming a hydrogen bond. The reason therefor is that in the hydrogen bond, the binding force per one bond is reasonable (i.e., the binding force is weak, or relaxation time is short), and thus rearrangement thereof is possible.

Examples of the functional group capable of forming a non-covalent bond may include an amide group, an imide group, a urethane bond, a carboxyl group or its salt, and a hydroxyl group or its salt.

Also, the functional group capable of forming a hydrogen bond is preferably at least one kind selected from the group consisting of an amide group, an imide group, a urethane bond, a carboxyl group, and a hydroxyl group.

The block copolymer B includes the functional group capable of forming a non-covalent bond, and the functional group capable of forming a non-covalent bond may be, for example, directly bonded with the block copolymer, and may be bonded via a linking group.

The block copolymer B is formed by introducing a functional group capable of forming a non-covalent bond into the block copolymer A. The method for introducing the functional group capable of forming a non-covalent bond may be a method that allows the introduction of the functional group capable of forming a non-covalent bond into the block copolymer A, and examples thereof may include a modification method with a modifier and a method using the functional group conversion reaction of alkene. Among them, the modification method with a modifier is preferable. In other words, it is preferable that the functional group capable of forming a non-covalent bond includes the residue of a modifier.

Also, when the modification method with a modifier is used, the functional group capable of forming a non-covalent bond may be introduced by the modification with the modifier, and the functional group capable of forming a non-covalent bond may be introduced by a further reaction after the modification with the modifier.

Incidentally, "the residue of modifier" signifies the portion derived from the modifier in the reaction product generated when the modifier reacts with the block copolymer A, or in the reaction product generated when the modifier reacts with the block copolymer A and further reacts with an additional compound.

Examples of the modifier may include an acid modifier. Also, examples of the acid modifier may include an unsaturated carboxylic acid and an unsaturated dicarboxylic acid anhydride. Among them, from the aspects such as the ease of reaction and economical efficiency, the unsaturated dicarboxylic acid anhydride is preferable. Incidentally, the unsaturated carboxylic acid and the unsaturated dicarboxylic acid anhydride are described later.

If the acid modifier is the unsaturated carboxylic acid, a carboxyl group derived from the unsaturated carboxylic acid will be introduced to the block copolymer A. Incidentally, the carboxyl group is a group capable of forming a non-covalent bond, and the carboxyl group may be substituted with a different functional group capable of forming a non-covalent bond if it is brought into further reaction after the modification with the acid modifier.

Also, if the acid modifier is the unsaturated dicarboxylic acid anhydride, an acid anhydride group derived from the unsaturated dicarboxylic acid anhydride will be introduced to the block copolymer A. Incidentally, when the acid modifier is the unsaturated dicarboxylic acid anhydride, the acid anhydride group may be substituted with a functional group capable of forming a non-covalent bond if it is brought into further reaction after the modification with the acid modifier. In specific, the acid anhydride group may be substituted with the functional group capable of forming a non-covalent bond when the acid anhydride group is brought into reaction with a base, or when the acid anhydride group is hydrolyzed with a base in a base treatment.

Above all, the method for introducing the functional group capable of forming a non-covalent bond is preferably the method of introducing the functional group capable of forming a non-covalent bond by a further base treatment after the modification with the acid modifier. In other words, the block copolymer B is preferably the one the block copolymer A acid-modified to be a modified block copolymer C further undergoes the base treatment. That is to say, the functional group capable of forming a non-covalent bond is preferably a group formed by a reaction of a carboxyl group or an acid anhydride group introduced to the block copolymer A with a base; or a group formed by hydrolyzing an acid anhydride group introduced to the block copolymer A with a base. In particular, the functional group capable of forming a non-covalent bond is preferably a group formed by a reaction of an acid anhydride group introduced to the block copolymer A with a base. Incidentally, such a method for introducing the functional group capable of forming a non-covalent bond is described in the section "B. Method for producing block copolymer composition" later.

Also, when the functional group capable of forming a non-covalent bond is a group formed by a reaction of a carboxyl group or an acid anhydride group introduced to the block copolymer A with a base, at least a part of the carboxyl group or the acid anhydride group introduced to the block copolymer A is to react with the base; a part of the carboxyl group or the acid anhydride group may react with the base, or the whole of the carboxyl group or the acid anhydride group may react with the base. In other words, the block copolymer B may include both of the group formed by the reaction of the carboxyl group or the acid anhydride group introduced to the block copolymer A with the base, and the carboxyl group or the acid anhydride group introduced to the block copolymer A.

Also, when the functional group capable of forming a non-covalent bond is a group formed by hydrolyzing the acid anhydride group introduced to the block copolymer A with the base, at least a part of the acid anhydride group introduced to the block copolymer A is to be hydrolyzed; a part of the acid anhydride group may be hydrolyzed, or the whole of the acid anhydride group may be hydrolyzed. In other words, the block copolymer B may include both of the group formed by hydrolyzing the acid anhydride group introduced to the block copolymer A with a base, and the acid anhydride group introduced to the block copolymer A.

Specific examples of the group formed by the reaction of the carboxyl group or the acid anhydride group with a base may include an amide group and the metal salt of a carboxyl group. Also, specific examples of the group formed by hydrolyzing the acid anhydride group with a base may include a carboxyl group.

In this manner, the functional group capable of forming a non-covalent bond preferably includes the residue of the acid modifier, specifically, preferably includes the residue of the unsaturated carboxylic acid or the unsaturated dicarboxylic acid anhydride, and more preferably includes the residue of the unsaturated dicarboxylic acid anhydride.

Examples of the unsaturated dicarboxylic acid may include a C8 or less ethyleny unsaturated carboxylic acid such as an acrylic acid, a methacrylic acid, a crotonic acid, a maleic acid, a fumaric acid, an itaconic acid, and a citraconic acid; and a Diels-Alder addition product of a conjugated diene and a C8 or less $\alpha,\beta$-unsaturated carboxylic acid such as 3,6-endomethylene-1,2,3,6-tetrahydrophthalic acid.

Examples of the unsaturated dicarboxylic acid anhydride may include a C8 or less $\alpha,\beta$-unsaturated dicarboxylic acid anhydride such as a maleic anhydride, an itaconic anhydride, and a citraconic anhydride; and a Diels-Alder addition product of a conjugated diene and a C8 or less $\alpha,\beta$-unsaturated dicarboxylic acid anhydride such as 3,6-endomethylene-1,2,3,6-tetrahydrophthalic anhydride.

From the aspects such as the ease of reaction and economical efficiency, the unsaturated dicarboxylic acid anhydride is preferable, the C8 or less $\alpha,\beta$-unsaturated dicarboxylic acid anhydride is more preferable, and the maleic anhydride is particularly preferable.

The functional group capable of forming a non-covalent bond may be configured by the residue of one kind or two kinds or more of the unsaturated dicarboxylic acid or the unsaturated dicarboxylic acid anhydride.

Also, the base may be the one that may react with the carboxyl group or the acid anhydride group to form the functional group capable of forming a non-covalent bond, or the one that may hydrolyze the acid anhydride group, and examples thereof may include at least one kind selected from the group consisting of an alkali metal-containing compound, an alkali earth metal-containing compound, ammonia, and an amine compound. Examples of the alkali metal-containing compound may include an oxide, hydroxide, carbonate, hydrogen carbonate, acetate, sulfate and phosphate of an alkali metal such as sodium, lithium, and potassium. Examples of the alkali earth metal-containing compound may include an oxide, hydroxide, carbonate, hydrogen carbonate, acetate, sulfate, and phosphate of an alkali earth metal such as magnesium and calcium. The amine compound may be any one of a primary amine compound, a secondary amine compound, and a tertiary amine compound. Also, the amine compound may be monoamine and may be diamine, but monoamine is preferably used since it is easily available. Examples of the amine compound may include an aliphatic amine, an aromatic amine, an alicyclic amine, and a heterocyclic amine. Among them, the aliphatic amine is preferable, particularly, a C1-12 alkyl amine is preferable, and a C2, 4, or 6 alkyl amine is more preferable.

Above all, it is preferable that the base is one kind selected from the group consisting of ammonia, the primary amine compound, and the secondary amine compound. The reason therefor is that they are capable of reacting with the carboxyl group or the acid anhydride group to generate an amide group.

The introduction rate of functional group capable of forming a non-covalent bond to the block copolymer B may be to the extent that allows the effect of the present invention to be obtained; for example, per 100 mol % of the conjugated diene monomer unit in the block copolymer B, it may be in a range of 0.1 mol % or more and 75 mol % or less, and preferably in a range of 0.5 mol % or more and 50 mol % or less. If the introduction rate of the functional group capable of forming a non-covalent bond is too high, many non-covalent bonds (non-covalent crosslinking points) would be formed and stress would be concentrated at the physical crosslinking points before the re-arrangement of the functional group capable of forming a non-covalent bond, which easily causes a fracture. Incidentally, the introduction rate of the functional group capable of forming a non-covalent bond may be calculated using $^1$H-NMR. Also, whether the functional group capable of forming a non-covalent bond is introduced or not can be confirmed by the $^1$H-NMR and/or an infrared spectroscopic analysis.

2. Other Polymers

The block copolymer composition of the present invention may be the one that includes just the block copolymer B as a polymer component, but it may include an additional polymer component thereto.

The block copolymer composition of the present invention may include, for example, the block copolymer A, in addition to the block copolymer B. It means that, when the block copolymer composition of the present invention comprises two kinds or more of the block copolymer including at least one aromatic vinyl polymer block and at least one conjugated diene polymer block, at least one kind of the block copolymer thereof includes the functional group capable of forming a non-covalent bond.

Also, examples of the polymer component other than the block copolymer B that can be included in the block copolymer composition of the present invention in addition to the block copolymer A, may include an aromatic vinyl-conjugated diene-aromatic vinyl block copolymer other than the block copolymer B, a conjugated diene polymer alone, an aromatic vinyl-conjugated diene random copolymer, and the branch-type polymer of these; a thermoplastic elastomer such as a polyurethane thermoplastic elastomer, a polyamide thermoplastic elastomer, and a polyester thermoplastic elastomer; and a thermoplastic resin such as polyethylene, polypropylene, polyvinyl chloride, an acrylonitrile-styrene copolymer, acrylonitrile-butadiene-styrene copolymer, and polyphenylene ether.

The content of these additional polymers in the block copolymer composition is preferably less than 50 mass %, and more preferably 20 mass % or less.

3. Other Components

The block copolymer composition of the present invention may contain a polyethylene wax as required. The polyethylene wax is a wax of which main constituent unit is an ethylene monomer unit. There are no particular limitations on the polyethylene wax used in the present invention, but preferably used is the one of which viscosity at 140° C. is 20 to 6,000 mPa·s.

The polyethylene wax is generally produced by the polymerization of ethylene or the decomposition of polyethylene, and either of the polyethylene wax may be used in the present invention. Also, the polyethylene wax is commercially available, and the specific examples thereof may include "A-C polyethylene" (from Honeywell Inc.), "Mitsui Hi-Wax™" (from Mitsui Chemicals Inc.), "SANWAX" (from Sanyo Chemical Industries, Ltd.), and "EPOLENE™" (from Eastman Chemical Company). Incidentally, these waxes may be the ones that have been modified (modified to be functional groups).

The block copolymer composition of the present invention may contain an antioxidant as required. There are no particular limitations on the kind thereof, and examples that can be used may include hindered phenolic compounds such as pentaerythritol tetrakis[3-(3,5-di-t-butyl-4-hydroxyphenyl)propionate], octadecyl-3-(3,5-di-t-butyl-4-hydroxyphenyl)propionate, 2,6-di-t-butyl-p-cresol, and di-t-butyl-4-methylphenol; thiodicarboxylate esters such as dilauryl thiopropionate; and phosphites such as tris(nonylphenyl) phosphate. The antioxidant may be used in one kind alone, and two or more kinds thereof may be used in combination.

The content of the antioxidant is not particularly limited, but per 100 parts by mass of the polymer component in the block copolymer composition, it is usually 10 parts by mass or less, and preferably 0.01 to 5 parts by mass.

Also, materials such as a tackifying resin, a softener, an antimicrobial agent, an optical stabilizer, an ultraviolet absorbent, a dye, a lubricant other than fatty acid monoamide and polyethylene wax may be further added to the block copolymer composition of the present invention as required.

There are no particular limitations on the method for mixing the block copolymer with the other components in order to obtain the block copolymer composition of the present invention. Examples thereof may include a method of dissolving each component in a solvent, uniformly mixing the solution, and then removing the solvent by heating or the like; and a method of melting and mixing the each component with means such as a screw extruder and a kneader. Among these, from the viewpoint of performing mixing more efficiently, the method of melting and mixing is suitable. Incidentally, the temperature at the time of melting and mixing is not particularly limited, but is usually in a range of 100 to 200° C.

4. Applications

There are no particular limitations on the applications of the block copolymer composition of the present invention and examples thereof may include a wide range of technical fields such as the medical field, the adhesive field, the electronics field, and the optics field. Examples of the applications may include an application as a material for forming goods such as a film, gloves, an elastic band, a contraceptive device, an OA equipment, various roles such as one for office usage, a vibration proof sheet for an electrical and an electronic equipment, anti-vibration rubber, a shock-absorbing sheet, a shock buffer film and sheet, a residential damping sheet, and a damping damper material; an application as a pressure sensitive adhesive used in materials such as an adhesive tape, an adhesive sheet, an adhesive label, and a roller for collecting garbage; an application as an adhesive used in materials such as hygiene supplies and book binding; and an application as an elastic fiber used in materials such as apparel and sporting goods.

B. Method for Producing Block Copolymer Composition

The method for producing the block copolymer composition of the present invention is a method comprising steps of: a first step of obtaining a modified block copolymer C to which a carboxyl group or an acid anhydride group is introduced via a reaction of a block copolymer A including at least one aromatic vinyl polymer block and at least one conjugated diene polymer block with an unsaturated carboxylic acid or an unsaturated dicarboxylic acid anhydride; and a second step of conducting a base treatment to the modified block copolymer C to obtain a block copolymer B to which a functional group capable of forming a non-covalent bond is introduced.

The method for producing the block copolymer composition of the present invention is the suitable method for producing the block copolymer composition described in the section "A. Block copolymer composition obtained by modification treatment" above.

1. Block Copolymer a

The block copolymer A used in the first step may be the same as the block copolymer A described in the section "A. Block copolymer composition obtained by modification treatment" above.

The block copolymer A can be produced according to a usual method. Polymerization methods such as living radical polymerization, living cationic polymerization, and ring-opening metathesis polymerization may be used, and examples of the most general production method may include a method in which the aromatic vinyl monomer and the conjugated diene monomer are respectively sequentially polymerized by a living anion polymerization method to form a polymer block and, as required, the polymer block is brought into reaction with a coupling agent to carry out coupling.

Also, when the block copolymer A is a mixture of two kinds or more of the block copolymers, there are no particular limitations on the method for obtaining the mixture of the block copolymers, and it can be produced according to conventional methods for producing block copolymers. For example, the mixture may be produced in a manner such that two kinds or more of the block copolymers are respectively separately produced and, as required, an additional polymer component and various additives are blended thereto, and then the product is mixed according to a usual method such as kneading and solution mixing.

Also, the method for obtaining the mixture of block copolymers may be, for example, a method for obtaining an aromatic vinyl-conjugated diene-aromatic vinyl block copolymer b by, after obtaining an aromatic vinyl-conjugated diene block copolymer a, bonding an aromatic vinyl polymer block to the end of a part of the aromatic vinyl-conjugated diene block copolymer a, that is, the method for preparing the two kinds of block copolymers at the same time. In specific, International Publication WO2009/123089 brochure, and JP-A No. 2012-77158 may be used as references.

Also, the obtained mixture of block copolymers may be processed to be in a pellet shape according to a usual method and then used.

Also, a commercial block copolymer may be used as the block copolymer, as described in the section "A. Block copolymer composition obtained by modification treatment" above.

2. First Step

In the first step, a modified block copolymer C to which a carboxyl group or an acid anhydride group is introduced is obtained by a reaction of the block copolymer A with an unsaturated carboxylic acid or an unsaturated dicarboxylic acid anhydride. In other words, the block copolymer A is acid-modified with the unsaturated carboxylic acid or the unsaturated dicarboxylic acid anhydride to obtain the modified block copolymer C. Incidentally, the acid-modification may be conducted once or multiple times. Also, if the acid-modification is to conduct multiple times, the conditions for the acid-modification may be the same, or may be different in each time.

The unsaturated carboxylic acid and the unsaturated dicarboxylic acid anhydride used as an acid modifier in the acid-modification reaction are the same as those described in the section "A. Block copolymer composition obtained by modification treatment" above. The unsaturated carboxylic acid and the unsaturated dicarboxylic acid anhydride may be used solely, or two kinds or more thereof may be used in combination.

The amount of use of the unsaturated carboxylic acid and the unsaturated dicarboxylic acid anhydride per 100 parts by mass of the block copolymer A is usually 0.01 to 200 parts by mass, and preferably 0.05 to 100 parts by mass.

The reaction temperature for the acid-modification reaction may be usually in a range of 50 to 300° C. If the reaction temperature is too low, there is a risk that the reaction efficiency may be inferior and the content of unreacted unsaturated carboxylic acid and unsaturated dicarboxylic acid anhydride in the modified block copolymer C may increase. Also, reaction time may be usually in a range of 5 minutes to 20 hours. If the reaction time is too short, there is a risk that the reaction efficiency may be inferior and the content of unreacted unsaturated carboxylic acid and unsaturated dicarboxylic acid anhydride in the modified block copolymer C may increase.

Also, on the occasion of the acid-modification reaction, as required, an agent such as a diluent, a gelation inhibitor, and a reaction promoting agent may be present.

The acid value of the modified block copolymer C is preferably 1.3 to 1050 KOHmg/g, and above all, preferably 6.5 to 700 KOHmg/g. If the acid value is too low or too high, intended elasticity and stress relaxation properties may not be obtained for the block copolymer composition to be obtained in some cases.

Incidentally, the acid value is, for example, the value measured for the modified block copolymer C in accordance with JIS K 0070.

The introduction rate of the carboxyl group and the acid anhydride group in the modified block copolymer C may be, for example, per 100 mol % of the conjugated diene monomer unit in the modified block copolymer C, in a range of 0.1 mol % or more and 75 mol % or less, and is preferably in a range of 0.5 mol % or more and 50 mol % or less. If the introduction rate of the carboxyl group and the acid anhydride group is too low or too high, intended elasticity and stress relaxation properties may not be obtained for the block copolymer composition to be obtained in some cases.

Incidentally, the introduction rate of the carboxyl group and the acid anhydride group may be calculated using $^1$H-NMR. Also, whether the carboxyl group and the acid anhydride group are introduced or not can be confirmed by the $^1$H-NMR and/or an infrared spectroscopic analysis.

After the acid modification reaction, it is preferable to remove unreacted unsaturated carboxylic acid and unsaturated dicarboxylic acid anhydride.

3. Second Step

In the second step, a base treatment is conducted to the modified block copolymer C to obtain the block copolymer B to which the functional group capable of forming a non-covalent bond is introduced. Incidentally, the base treatment may be conducted once or multiple times. Also, if the base treatment is to conduct multiple times, the conditions for the base treatment may be the same, or may be different in each time.

The base used in the base treatment is the same as that described in the section "A. Block copolymer composition obtained by modification treatment" above. The base may be used solely, or two kinds or more thereof may be used in combination.

The base treatment varies with the kind of the carboxyl group and the acid anhydride group introduced to the modified block copolymer C, and the kind of the base. For example, in the case of the carboxyl group and the acid anhydride, when ammonia, the primary amine compound, and the secondary amine compound are used as the base, in the base treatment, the carboxyl group or the acid anhydride group is brought into reaction with the base so as to obtain the functional group capable of forming a non-covalent bond. In other words, in this case, in the base treatment, the modified block copolymer C may be modified with the amine. Also, for example, in the case of the acid anhydride, when the alkali metal-containing compound, the alkali earth metal-containing compound, and the tertiary amine compound are used as the base, in the base treatment, the hydrolysis decomposition of the acid anhydride group is conducted with the base to obtain the functional group capable of forming a non-covalent bond.

The amount of use of the base is appropriately selected in accordance with the kind of the base treatment. For example, in the base treatment, when the carboxyl group or the acid anhydride group are brought into reaction with the base and, for example, when the modification is conducted with amines, the amount of use of the base may be equimolar or more of the carboxyl group or the acid anhydride group introduced to the modified block copolymer C, and it may be specifically 1 to 2 times the mole. Also, for example, in the base treatment, when the hydrolysis decomposition of the acid anhydride group is conducted with the base to obtain a carboxyl group, there are no particular limitations on the amount of use of the base; for example, it may be equimolar or more of the acid anhydride group introduced to the modified block copolymer C.

The base treatment may be conducted without a solvent, and may be conducted in a solvent. If the base treatment is conducted in a solvent, examples of the solvent may include C1-2 aliphatic halogenated hydrocarbons such as 1,2-dichloroethane, chloroform, dichloromethane, and 1,1-dichloroethane; aliphatic cyclic hydrocarbons such as cyclohexane, methylcyclohexane, and cyclopentane; nitromethane, nitrobenzene, acetonitrile, tetrahydrofuran, tetrahydropiran, 1,2-dimethoxyethane, acetone, methyl ethyl ketone, dimethyl sulfoxide, dimethylformamide, pyrrolidone, and water. The solvent may be used solely, and two kinds or more thereof may be used in combination.

The reaction temperature of the base treatment varies with the kind of the carboxyl group and the acid anhydride group introduced to the modified block copolymer C, and the kind of the base but, for example, it may be 0 to 200° C., and is preferably 10 to 150° C. If the reaction temperature is too low, there is a risk that the reaction speed may be slower, and if the reaction temperature is too high, there is a risk that the block copolymer C may be thermally decomposed. Also, the reaction time varies with the reaction temperature but, for example, it may be 1 minute to 40 hours, and is preferably 3 minutes to 2 hours. If the reaction time is too short, there is a risk that the reaction may not sufficiently proceed, and if the reaction time is too long, there is a risk that the reaction efficiency may be inferior.

After the base treatment, residual base is preferably removed. The method of removal may be appropriately selected in accordance with the kind of the base treatment and the base, and examples of the method may include washing, neutralization, filtration, and drying.

The functional group capable of forming a non-covalent bond and the introduction rate thereof are as described in the section "A. Block copolymer composition obtained by modification treatment" above.

C. Modified Block Copolymer Composition

The modified block copolymer composition of the present invention comprises a modified block copolymer C formed by introducing a carboxyl group or an acid anhydride group derived from an unsaturated carboxylic acid or an unsaturated dicarboxylic acid anhydride into a block copolymer A including at least one aromatic vinyl polymer block and at least one conjugated diene polymer block.

The modified block copolymer composition of the present invention is suitably used as the precursor of the block copolymer composition described in the section "A. Block copolymer composition obtained by modification treatment" above.

Incidentally, the block copolymer A may be the same as the block copolymer A described in the section "A. Block copolymer composition obtained by modification treatment" above. Also, the modified block copolymer C may be the same as the modified block copolymer C described in the section "B. Method for producing block copolymer composition" above.

The modified block copolymer composition of the present invention may be the one that includes just the modified block copolymer C as the polymer component, but it may be the one that includes an additional polymer component thereto. Incidentally, the additional polymer component may be the same as the additional polymer components described in the section "A. Block copolymer composition obtained by modification treatment 2. Other polymers" above.

Also, the modified block copolymer composition of the present invention may contain an additional component as required. Incidentally, the additional component may be the same as the additional components described in the section "A. Block copolymer composition obtained by modification treatment 3. Other components" above.

D. Method for Producing Modified Block Copolymer Composition

The method for producing the modified block copolymer composition of the present invention is a method comprising a step of obtaining a modified block copolymer C to which a carboxyl group or an acid anhydride group is introduced via a reaction of a block copolymer A including at least one aromatic vinyl polymer block and at least one conjugated diene polymer block with an unsaturated carboxylic acid or an unsaturated dicarboxylic acid anhydride.

The method for producing the modified block copolymer composition of the present invention is a suitable method for producing the modified block copolymer composition described in the section "C. Modified block copolymer composition" above.

Incidentally, the step of obtaining the modified block copolymer C may be the same as the first step described in "B. Method for producing block copolymer composition" above.

The present invention is not limited to the embodiments. The embodiments are exemplifications, and any other variations are intended to be included in the technical scope of the present invention if they have substantially the same constitution as the technical idea described in the claim of the present invention and offer similar operation and effect thereto.

EXAMPLES

Hereinafter, the present invention will be more specifically described by way of Examples and Comparative Examples. Incidentally, unless particularly stated otherwise, parts and percentage (%) in the various Examples are on a mass basis.

Example 1

In Example 1, as a block copolymer, which was a base polymer, Quintac (registered trademark) 3520 (from ZEON CORPORATION, polystyrene-polyisoprene block copolymer composition) was used and, in accordance with the below reaction, modification with a maleic anhydride was conducted and a modification treatment with amines was further conducted. Specific procedures are shown below.

[Chemical Formula 1]

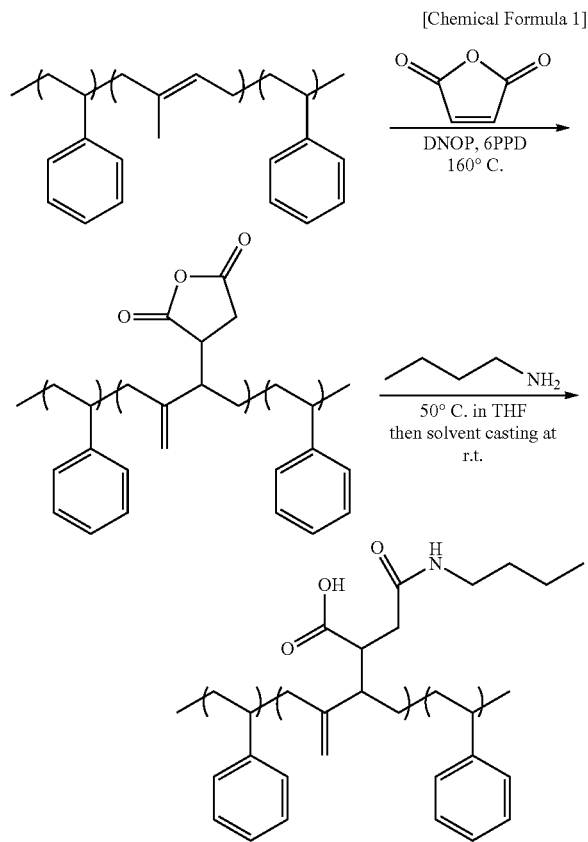

[1-1] First Step (Modification with Maleic Anhydride)

The base polymer: block copolymer (Quintac™3520), the antioxidant N-(1,3-dimethylbutyl)-N'-phenyl-1,4-phenylenediamine (hereinafter referred to as 6PPD), and the solvent: cyclohexane, were respectively weighed so as to be 5.00 g, 17.2 mg, and 25.0 g, and mixed by a magnetic stirrer in a round bottom flask for 14.5 hours at a room temperature, and thereby a solution was prepared. Di-n-octyl phthalate (hereinafter, referred to as DNOP) of 23.2 g which is a solvent with high boiling point was added to this solution and mixed, and then rotary evaporation was conducted at 70° C. for 30 minutes using a rotary evaporator in order to remove the cyclohexane in the obtained solution. Maleic anhydride of 5.04 g was added to the remaining solution, and inside the flask was replaced with nitrogen, and then the mixture was stirred at 100° C. and 100 rpm for about 5 minutes in a normal pressure using an oil bath, and thereby a reaction solution was prepared. After the maleic anhydride was completely dissolved, the flask was moved to an oil bath at about 160° C. and the mixture was stirred at 250 rpm for 2 hours to carry out the reaction. After that, the flask was taken out from the oil bath and the reaction was terminated.

Toluene of 45 mL was added to the solution, and this solution was dropped to acetonitrile of 750 mL to precipitate a block copolymer modified with the maleic anhydride. The obtained polymer was separated by decantation, sufficiently dried by vacuum-drying, then dissolved in the toluene again, and dropped to the acetonitrile to precipitate a polymer. The obtained polymer was separated by decantation, and sufficiently dried by vacuum-drying. Through this process, unreacted maleic anhydride and the solvent: DNOP were removed.

Refined maleic anhydride-modified block copolymer was dissolved in a deuterochloroform solution so as to prepare the solution of approximately 2 mass %, and the introduction rate of the acid anhydride group derived from the maleic anhydride to the polyisoprene block in the block copolymer was determined by a proton nuclear magnetic resonance spectroscopy ($^1$H-NMR). The peak derived from the acid anhydride group derived from the maleic anhydride was observed in 2.7 to 3.4 ppm, and from the integral ratio with the peak 6.1 to 7.23 ppm derived from the phenyl group in polystyrene, the peak 4.5 to 4.85 ppm derived from poly(3, 4-isoprene), and the peak 4.85 to 5.4 ppm derived from poly(1,2-isoprene), the introduction rate of the acid anhydride group derived from maleic anhydride was estimated to be 11.2 mol %.

Also, the polymer was dissolved in tetrahydrofuran (hereinafter referred to as THF) so as to prepare the solution of approximately 0.5 mass %, and the measurement was conducted by a gel permeation chromatography (GPC). Incidentally, the measurement was conducted with THF as an effluent at the flow speed of 1 mL/min in the state three columns of TSK-GEL column 5000HHR from Tosoh Corporation were connected. It was confirmed that the cut-out in conjugated diene part scarcely occurred.

Also, the polymer was dissolved in THF so as to prepare the solution of approximately 8 mass %, 10 drops of the solution was dropped to a plate made of aluminum using a path tool pipette, the plate was placed still for 3 hours or more at a room temperature, and thereby the THF was evaporated. After that, the plate was dried using a vacuum drying machine for 3 hours or more to completely remove the solvent, and Fourier transform infrared reflection absorption spectroscopy (FT-IR) measurement was conducted for the obtained film. As a result, in the pre-maleic-anhydride-modified block copolymer, absorption was not confirmed in 1750 to 1900 cm$^{-1}$, but in the maleic anhydride-modified block copolymer, the absorption derived from the carbonyl group derived from maleic anhydride was confirmed in 1750 to 1900 cm$^{-1}$. Incidentally, used measurement device was an infrared spectrophotometer IR Prestige-21 (from Shimadzu Corporation) with an infrared microscope (AIM8800) from Shimadzu Corporation attached thereto.

[1-2] Second Step (Modification with Base)

The acid anhydride group derived from maleic anhydride in the obtained maleic anhydride-modified block copolymer (in which the introduction rate of the acid anhydride group derived from maleic anhydride was 11.2 mol %) was an acid anhydride having high reactivity, and thus it was presumed that it would react with monoamine compound to form a carboxylic acid group and an amide group (the functional group capable of forming a non-covalent bond). In a sample bottle, 500 mg of the maleic anhydride-modified block copolymer was dissolved in 5.00 g of THF, and 506 mg of the n-butylamine 10 mass % solution in THF prepared in advance was further added thereto. At this time, the acid anhydride group and the n-butylamine were almost equimolar amount. Inside the sample bottle was replaced with nitrogen, and the mixture was stirred on a hot plate at 50° C. in 300 rpm for approximately 13 hours. The solution after the reaction was transferred to a Teflon (registered trademark) beaker having the capacity of 20 mL, and the beaker was placed still as it was at a room temperature for one and a half days to evaporate the THF solvent. After that, the solution was dried using a vacuum drying machine for approximately one day to completely remove the solvent. The obtained modified sample was in a film shape, and the thickness thereof was approximately 0.46 mm.

The obtained modified sample was dissolved in a deuterochloroform so as to prepare the solution of approximately 2 mass %, $^1$H-NMR method was conducted thereto, and the peak intensity derived from the proton of a methylene group adjacent to the nitrogen atom in the amide group was observed in 3.0 to 3.3 ppm; thus, it was confirmed that the functional group capable of forming a non-covalent bond was introduced. Also, FT-IR measurement was conducted in the same manner as that prior to the modification with amine, and the absorption derived from the N—H stretching vibrations of the amide group in 3100 to 3600 cm$^{-1}$ not observed prior to the modification with amine was newly observed.

[1-3] Tensile Test

The obtained modified sample in a film shape was punched out using a punching blade mold, and a 4 mm width dog bone shaped test piece was prepared. Measurement was conducted using a measurement device AGS-X, 50 N Load Cell and 50 N clip-gripper from Shimadzu Corporation, with the distance between grippers being 8.5 mm, and the initial strain-rate of 0.33/s (tension rate of 2.8 mm/s). Young's modulus was calculated in the area within 10% of the strain, and the toughness was calculated from the inner area of S-S curve until the fracture. As the results of the tensile test, Young's modulus, maximum stress, breaking elongation and toughness were respectively 0.99 MPa, 7.1 MPa, 1850%, and 44 MJ/m$^3$. Incidentally, the Young's modulus was determined from the initial grade (strain of 10%) of stress-strain curve, the maximum stress was the maximum value of stress, the breaking elongation was elongation when fracture occurred, and the toughness was determined from the inner area of stress-strain curve.

[1-4] Stress Relaxation Test A modified sample in a film shape was punched out using a punching blade mold and a 4 mm width dog bone shaped test piece was prepared in the same manner as in 1-3 Tensile test. The thickness of the test piece was approximately 0.60 mm. The stress relaxation test was conducted for 20 hours in the same manner as in the tensile test using a measurement device AGS-X, 50 N Load Cell and 50 N clip-gripper from Shimadzu Corporation, with the distance between grippers being 8.7 mm, and the initial strain-rate of 1.5/s (tension rate of 13 mm/s), and strain of 1000%. Since no fracture occurred after keeping the strain of 1000% for 20 hours, excellent stress relaxation was confirmed.

Comparative Example 1

In Comparative Example 1, a tensile test was conducted to the block copolymer (Quintac™ 3520), which was the base polymer. The block copolymer (Quintac™ 3520) of 500 mg was dissolved in THF of 5.00 g, obtained solution was transferred to a Teflon (registered trademark) beaker having the capacity of 20 mL, and the beaker was placed still as it was at a room temperature for one and a half days to evaporate the THF solvent. After that, the solution was dried using a vacuum drying machine for approximately one day to completely remove the solvent. The thickness of the obtained film sample was approximately 0.52 mm. The obtained film sample was punched out using a punching blade mold, a 4 mm width dog bone shaped test piece was prepared, and the tensile test was conducted with the distance between grippers being 9.3 mm, and the initial strain-rate of 0.33/s (tension rate of 3.1 mm/s). As the results of the tensile test, Young's modulus, maximum stress, breaking elongation and toughness were respectively 1.7 MPa, 1.4 MPa, 1730%, and 16 MJ/m$^3$.

The maximum stress of the sample in Comparative Example 1 was approximately ⅕ compared to that in Example 1, and as the result, the toughness was also approximately ⅓. Example 1 exhibited fine mechanical characteristics presumably because the amide group and carboxylic acid generated by the modification treatment formed hydrogen bonds between the modified polyisoprene blocks and artificially showed the activities similar to those of triblock copolymer.

Example 2

In Example 2, a tensile test was conducted to the maleic anhydride-modified block copolymer Example 1 (in which the introduction rate of the acid anhydride group derived from the maleic anhydride was 11.2 mol %) without the modification treatment with amine. A film sample was prepared in the same manner as in Comparative Example 1, except that the maleic anhydride-modified block copolymer of 500 mg and the THF of 5.10 g were used. The thickness of the obtained film sample was approximately 0.61 mm. The obtained film sample was punched out using a punching blade mold, a 4 mm width dog bone shaped test piece was prepared, and the tensile test was conducted with the distance between grippers being 12.5 mm, and the initial strain-rate of 0.33/s (tension rate of 4.1 mm/s). As the results of the tensile test, Young's modulus, maximum stress, breaking elongation and toughness were respectively 0.95 MPa, 0.72 MPa, 1040%, and 5.7 MJ/m$^3$.

The mechanical characteristics of the maleic anhydride-modified block copolymer in Examples 2 was greatly inferior to the sample (Example 1) after the modification with amine. This was presumably because the acid anhydride group derived from the maleic anhydride did not form the non-covalent bond, and thus it did not show the excellent mechanical characteristics as those of the sample (Example 1) after the modification with amine.

Example 3

In Example 3, a modification treatment using ethylamine was conducted to the maleic anhydride-modified block copolymer obtained in Example 1 (in which the introduction rate of the acid anhydride group derived from the maleic anhydride was 11.2 mol %). A modified sample in a film shape was prepared in the same manner as in Example 1, except that the maleic anhydride-modified block copolymer, the THF, and the ethylamine 10 mass % solution in THF were used in the amount of respectively 500 mg, 5.00 g, and 314 mg. The thickness of the obtained modified sample was approximately 0.52 mm.

The $^1$H-NMR measurement was conducted to the obtained modified sample in the same manner as in Example 1, and the peak derived from the proton of a methylene group adjacent to the nitrogen atom in the amide group was observed in 3.0 to 3.3 ppm; thus, it was confirmed that the functional group capable of forming a non-covalent bond was introduced. Also, FT-IR measurement was conducted in the same manner as that prior to the modification with amine, and the absorption derived from the N—H stretching vibrations of the amide group in 3100 to 3600 cm$^{-1}$ not observed prior to the modification with amine was newly observed.

The obtained modified sample was punched out using a punching blade mold, and a 4 mm width dog bone shaped test piece was prepared. The tensile test was conducted with the distance between grippers being 10.6 mm, and the initial strain-rate of 0.33/s (tension rate of 3.5 mm/s). As the results of the tensile test, Young's modulus, maximum stress, breaking elongation and toughness were respectively 1.4 MPa, 10.4 MPa, 1740%, and 59.9 MJ/m$^3$. Also, the stress relaxation test was conducted in the same manner as in Example 1, and the same result as that in Example 1 was obtained.

Example 4

In Example 4, a modification treatment using n-hexyl amine was conducted to the maleic anhydride-modified block copolymer obtained in Example 1 (in which the introduction rate of the acid anhydride group derived from the maleic anhydride was 11.2 mol %). A modified sample in a film shape was prepared in the same manner as in Example 1, except that the maleic anhydride-modified block copolymer, the THF, and the n-hexyl amine 10 mass % solution of in THF were used in the amount of respectively 500 mg, 5.00 g, and 702 mg. The thickness of the obtained modified sample was approximately 0.57 mm.

The $^1$H-NMR measurement was conducted to the obtained modified sample in the same manner as in Example 1, and the peak derived from the proton of a methylene group adjacent to the nitrogen atom in the amide group was observed in 3.0 to 3.3 ppm; thus, it was confirmed that the functional group capable of forming a non-covalent bond was introduced. Also, FT-IR measurement was conducted in the same manner as that prior to the modification with amine, and the absorption derived from the N—H stretching vibrations of the amide group in 3100 to 3600 cm$^{-1}$ not observed prior to the modification with amine was newly observed.

The obtained modified sample was punched out using a punching blade mold, and a 4 mm width dog bone shaped test piece was prepared. The tensile test was conducted with the distance between grippers being 9.1 mm, and the initial strain-rate of 0.33/s (tension rate of 3.0 mm/s). As the results of the tensile test, Young's modulus, maximum stress, breaking elongation and toughness were respectively 0.98 MPa, 6.1 MPa, 1810%, and 39 MJ/m$^3$. Also, the stress relaxation test was conducted in the same manner as in Example 1, and the same result as that in Example 1 was obtained.

Example 5

In Example 5, a modification treatment using n-octyl amine was conducted to the maleic anhydride-modified block copolymer obtained in Example 1 (in which the introduction rate of the acid anhydride group derived from the maleic anhydride was 11.2 mol %). A modified sample in a film shape was prepared in the same manner as in Example 1, except that the maleic anhydride-modified block copolymer, the THF, and the n-octyl amine were used in the amount of respectively 500 mg, 5.00 g, and 93 mg. The thickness of the obtained modified sample was approximately 0.60 mm.

The $^1$H-NMR measurement was conducted to the obtained modified sample in the same manner as in Example 1, and the peak derived from the proton of a methylene group adjacent to the nitrogen atom in the amide group was observed in 3.0 to 3.3 ppm; thus, it was confirmed that the functional group capable of forming a non-covalent bond was introduced. Also, FT-IR measurement was conducted in the same manner as that prior to the modification with amine, and the absorption derived from the N—H stretching vibrations of the amide group in 3100 to 3600 cm$^{-1}$ not observed prior to the modification with amine was newly observed.

The obtained modified sample was punched out using a punching blade mold, and a 4 mm width dog bone shaped test piece was prepared. The tensile test was conducted with the distance between grippers being 11.1 mm, and the initial strain-rate of 0.33/s (tension rate of 3.7 mm/s). As the results of the tensile test, Young's modulus, maximum stress, breaking elongation and toughness were respectively 1.1 MPa, 7.2 MPa, 1700%, and 44 MJ/m$^3$. Also, the stress relaxation test was conducted in the same manner as in Example 1, and the same result as that in Example 1 was obtained.

Example 6

The modification with the maleic anhydride was conducted in the same manner as in Example 1, except that Kraton D1102 (from Kraton JSR Elastomers Corporation, polystyrene-polybutadiene block copolymer composition) was used as the block copolymer which was the base polymer, and the modification treatment with n-butyl amine was further conducted. The introduction rate of the acid anhydride group derived from maleic anhydride was estimated to be 5.9 mol %. In this Example also, it was confirmed that the functional group capable of forming a non-covalent bond was introduced.

A tensile test almost in the same manner as in Example 1 was conducted; as the result, Young's modulus, maximum stress, breaking elongation and toughness were respectively 5.5 MPa, 5.2 MPa, 1000%, and 29 MJ/m$^3$. Also, the stress relaxation test was conducted in the same manner as in Example 1, and the same result as that in Example 1 was obtained.

The invention claimed is:

1. A block copolymer composition obtained by a modification treatment, the block copolymer composition comprising a block copolymer B formed by introducing a functional group capable of forming a non-covalent bond into a block copolymer A including at least one aromatic vinyl polymer block and at least one conjugated diene polymer block;
   a weight average molecular weight of the aromatic vinyl polymer block is in a range of 3,000 to 50,000; and
   a vinyl bond content in the conjugated diene polymer block is in a range of 0.1 mol % to 50 mol % and a weight average molecular weight therein is in a range of 40,000 to 400,000.

2. The block copolymer composition obtained by a modification treatment according to claim 1, wherein the functional group capable of forming a non-covalent bond is: a group formed by a reaction of a carboxyl group or an acid anhydride group introduced to the block copolymer A with a base; or a group formed by hydrolyzing an acid anhydride group introduced to the block copolymer A with a base.

3. The block copolymer composition obtained by a modification treatment according to claim 2, wherein the acid anhydride group is a group derived from an unsaturated dicarboxylic acid anhydride.

4. The block copolymer composition obtained by a modification treatment according to claim 2, wherein the base is at least one kind selected from the group consisting of an alkali metal-containing compound, an alkali earth metal-containing compound, ammonium, and an amine compound.

5. The block copolymer composition obtained by a modification treatment according to claim 1, wherein the functional group capable of forming a non-covalent bond is a functional group capable of forming a hydrogen bond.

6. The block copolymer composition obtained by a modification treatment according to claim 1, wherein the aromatic vinyl polymer block is polystyrene.

7. The block copolymer composition obtained by a modification treatment according to claim 1, wherein the conjugated diene polymer block is polybutadiene and/or polyisoprene.

8. A method for producing a block copolymer composition, the method comprising steps of:
- a first step of obtaining a modified block copolymer C to which a carboxyl group or an acid anhydride group is introduced via a reaction of a block copolymer A including at least one aromatic vinyl polymer block and at least one conjugated diene polymer block, wherein a weight average molecular weight of the aromatic vinyl polymer block is in a range of 3,000 to 50,000; and a vinyl bond content in the conjugated diene polymer block is in a range of 0.1 mol % to 50 mol % and a weight average molecular weight therein is in a range of 40,000 to 400,000, with an unsaturated carboxylic acid or an unsaturated dicarboxylic acid anhydride; and
- a second step of conducting a base treatment to the modified block copolymer C to obtain a block copolymer B to which a functional group capable of forming a non-covalent bond is introduced.

9. The method for producing the block copolymer composition according to claim 8, wherein, in the first step, the reaction involves the unsaturated dicarboxylic acid anhydride.

10. The method for producing the block copolymer composition according to claim 8, wherein, in the second step, at least one kind of base selected from the group consisting of an alkali metal-containing compound, an alkali earth metal-containing compound, ammonium, and an amine compound, is used.

* * * * *